Patented July 13, 1948

2,445,208

UNITED STATES PATENT OFFICE 2,445,208

SOLUTIONS OF RIBOFLAVIN

Jesse Charney, New York, N. Y., assignor to Wyeth Incorporated, Philadelphia, Pa., a corporation of Delaware No Drawing. Application February 4, 1946, Serial No. 645,498

4 Claims. (Cl. 167—81)

This invention relates to solutions of riboflavin (6,7-dimethyl-9-d-ribitylisoalloxazine) and more particularly to high concentration solutions of riboflavin and multivitamin solutions containing riboflavin for oral and parenteral use.

It is known that water alone will dissolve about 0.13 milligrams of riboflavin per cubic centimeter (0.013%) at room temperature while more concentrated solutions prepared by means of heating will crystallize out on standing. However, water solutions of riboflavin are so low in concentration as to require excessively large volumes for administration. This applies also to multivitamin solutions containing riboflavin.

The art has therefore sought for solubilizing agents which possess a stronger dissolving action for riboflavin and multivitamin compositions containing riboflavin than water, and which at the same time would have the very important qualities of yielding solutions which are physiologically non-toxic and also stable over a relatively long period of time.

It is an object of this invention to obtain stable and non-toxic solutions of riboflavin of higher concentration than can be obtained by water alone.

A further object of this invention is to obtain stable and non-toxic solutions of multivitamin compositions containing riboflavin with higher concentration of the latter than can be obtained by water alone.

It has been found that an aqueous solution of 1-tyrosine amide is an excellent solvent for riboflavin and the resulting solution is stable and physiologically non-toxic.

Since 1-tyrosine amide reacts basic in solution and in view of the fact that riboflavin is stable within a pH of 2.5 to 6, the solution of 1-tyrosine amide is adjusted to a pH within this range preferably within a pH range between 5 and 6 by the use of an acid, either organic or inorganic, preferably a mineral acid and still more preferably HCl.

It has also been found that not only 1-tyrosine amide but its acid-addition salts are also suitable as solubilizing agents. Obviously, the addition salts must be chosen from those that are physiologically non-toxic and it is within the skill of the art to select those salts known to be physiologically safe. For example, the hydrochloride, the phosphate and the acetate salts of 1-tyrosine amide may be used instead of 1-tyrosine amide. Specifically, I prefer 1-tyrosine amide-hydrochloride if an acid-addition salt is selected.

The hydrochloride salt of 1-tyrosine amide may be prepared by dissolving 1-tyrosine amide in 95% ethyl alcohol and adding an excess of concentrated hydrochloric acid to the solution. Crystals of 1-tyrosine amide-hydrochloride are formed which are removed, washed with alcohol and dried at about 100° C.

The acetate salt of 1-tyrosine-amide may be prepared by the addition of an excess of concentrated acetic acid to 1-tyrosine amide. The salt is obtained by removing excess acetic acid by evaporation under reduced pressure.

The phosphate salt of 1-tyrosine amide may be prepared by dissolving 1-tyrosine amide in water and neutralizing the solution with phosphoric acid to pH 4.5. The salt is obtained by evaporating to dryness under reduced pressure.

It is, of course, obvious that if the acid-addition salt is formed from 1-tyrosine amide in solution by the addition of an acid, the pH must be adjusted to the stability range of riboflavin, preferably a pH between 5 and 6. Since the acid-addition salt would react acidic in solution, the pH of the solution is adjusted if necessary, by the use of a base, preferably NaOH.

The amount of 1-tyrosine amide or its acid-addition salt that may be used in solution is limited by its solubility in water at room temperature and by the amount of riboflavin or riboflavin-containing vitamins that one would desire to use. Thus, the limit of solubility of 1-tyrosine amide at room temperature and slightly acid pH (5.5) is roughly about 5.5% by weight, based on the weight of water. Obviously, a 5.5% solution will dissolve the greatest amount of riboflavin. If less riboflavin in solution is needed or desired, a weaker solution of the amide or its acid-addition salt would be indicated. The examples are limited to 4% solutions for illustrative purposes only, but I do not desire to be bound to this particular percentage. The limit of solubility of the hydrochoride at 20° C. is roughly about 5% by weight.

As stated before, water alone will dissolve about 0.13 mg. of riboflavin per cubic centimeter at room temperature while more concentrated solutions prepared by heating will crystallize out on standing. On the other hand, it has been found that a 4% solution of 1-tyrosine amide adjusted to a pH of 5.0 with HCl will dissolve about 0.52 mg. of riboflavin per cubic centimeter by shaking at room temperature which will remain soluble indefinitely. I have further found that the same solution at the same pH will dissolve 2 mg. of riboflavin per cubic centimeter when heating the mixture for 5 to 10 minutes at about 100° C. Such solutions have been observed after two, months of storage at room temperature and also at 0° C. No riboflavin separated from the solutions prepared at substantially 100° C. This increase in solubility at the higher temperature without precipitation of riboflavin from solution on standing is also a characteristic of the acid-addition salts of the amide.

A still further factor has been found in preparing multivitamin solutions. While 1-tyrosine amide, for example, in a 4% solution adjusted to a pH of 5.0 with HCl will dissolve 2 mg. of riboflavin per cubic centimeter in the neighborhood of 100° C., 1-tyrosine amide solutions containing nicotinamide in addition to riboflavin will permit an increased amount of riboflavin to go into a stable solution. For example, when 5% by weight of nicotinamide, based on the weight of water was added to 4% tyrosine amide solution, 3 mg. of riboflavin per cubic centimeter of water could be dissolved at 100° C. When 10% nicotinamide was added 4.5 mg. of riboflavin per cubic centimeter could be dissolved at 100° C. These solutions had been stored at 0° C. and at room temperature for six months and have been found to be perfectly clear.

In the preparation of my aqueous solution containing 1-tyrosine amide or its acid-addition salts, the solution may contain either riboflavin alone or riboflavin together with nicotinamide, thiamine hydrochloride, calcium pantothenate, vitamin B6 hydrochloride and other water-soluble growth promoting and accessory factors, such as pantothenic acid, folic acid, biotin, choline chloride, inositol and ascorbic acid.

The solutions of riboflavin and multivitamin solutions containing riboflavin have been stored at room temperature and at 0° C. for relatively long periods of time without showing any precipitation or destruction of vitamin content. Moreover, the solutions have been heated or autoclaved for sterilization without showing any signs of precipitation or destruction.

Experimental evidence has failed to show any toxic effect of the amide upon oral or parenteral administration.

The following examples are illustrative of the invention:

*Example 1*

Four grams of 1-tyrosine amide is dissolved in 100 grams of water. The pH is adjusted to 5.0 with hydrochloric acid. To this solution, 200 mg. of riboflavin is added which completely dissolves when heating the solution for 5 to 10 minutes at 100° C.

*Example 2*

Four grams of 1-tyrosine amide is dissolved in 100 grams of water. The pH is adjusted to 5.5 with HCl. To this solution is added 200 mg. of riboflavin, and 500 mg. each of thiamine hydrochloride, calcium pantothenate and pyridoxine. The mixture is heated to 100° C. until complete solution is obtained. The solution is then cooled to room temperature, filtered if necessary, and then packaged.

*Example 3*

Forty grams of 1-tyrosine amine (pH adjusted to 5.5 with HCl), 3 grams of riboflavin, 25 grams of nicotinamide, and 5 grams each of thiamine hydrochloride, calcium pantothenate and vitamin B6 hydrochloride in 1 liter of water are held at 100° C. until complete solution is obtained. The solution is then cooled and filtered, if necessary.

*Example 4*

Forty grams of 1-tyrosine amide (pH adjusted to 5.5 with hydrochloric acid), 4.5 grams of riboflavin, 100 grams of nicotinamide and 5 grams each of thiamine hydrochloride, calcium pantothenate and vitamin B6 hydrochloride in 1 liter of water are held at 100° C. until complete solution takes place, which takes about 5 to 10 minutes. The solution is then cooled and filtered, if necessary.

Since many apparent and different embodiments of this invention may be made without departing from the spirit and scope thereof, it is to be understood that I do not limit myself to a specific embodiment thereof except as defined in the appended claims.

I claim:

1. An aqueous solution comprising riboflavin in a concentration higher than that obtainable with water alone and a solubilizing agent selected from the group consisting of 1-tyrosine amide and its acid-addition salts.

2. An aqueous solution comprising riboflavin in a concentration higher than that obtainable with water alone and 1-tyrosine amide.

3. An aqueous solution comprising riboflavin in a concentration higher than that obtainable with water alone and 1-tyrosine amide hydrochloride.

4. An aqueous solution of more than 0.013% riboflavin containing 1-tyrosine amide acid-addition salt.

JESSE CHARNEY.

REFERENCES CITED

The following references are of record in the file of this patent:

UNITED STATES PATENTS

| Number | Name | Date |
|---|---|---|
| 2,256,604 | Auhagen | Sept. 23, 1941 |
| 2,358,331 | Jurist | Sept. 19, 1944 |
| 2,388,261 | Frost | Nov. 6, 1945 |
| 2,407,412 | Frost | Sept. 10, 1946 |

FOREIGN PATENTS

| Number | Country | Date |
|---|---|---|
| 485,569 | Great Britain | May 17, 1938 |